US009743295B2

United States Patent
Narayanan

(10) Patent No.: US 9,743,295 B2
(45) Date of Patent: Aug. 22, 2017

(54) RADIO ACCESS NETWORK TROUBLESHOOTING USING DEVICE-TO-DEVICE COMMUNICATIONS

(71) Applicant: Verizon Patent and Licensing Inc., Arlington, VA (US)

(72) Inventor: Ram Gopal Lakshmi Narayanan, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 78 days.

(21) Appl. No.: 14/862,066

(22) Filed: Sep. 22, 2015

(65) Prior Publication Data
US 2017/0086082 A1    Mar. 23, 2017

(51) Int. Cl.
| H04L 1/00 | (2006.01) |
| H04W 24/04 | (2009.01) |
| H04W 76/02 | (2009.01) |
| H04W 40/34 | (2009.01) |
| H04L 12/24 | (2006.01) |

(52) U.S. Cl.
CPC ......... *H04W 24/04* (2013.01); *H04L 41/0668* (2013.01); *H04W 40/34* (2013.01); *H04W 76/027* (2013.01)

(58) Field of Classification Search
CPC combination set(s) only.
See application file for complete search history.

(56) References Cited

U.S. PATENT DOCUMENTS

| 9,288,130 B2 * | 3/2016 | Kogan ................... H04W 24/04 |
| 2006/0068712 A1* | 3/2006 | Kroboth ................ H04W 24/08 455/67.11 |
| 2008/0089272 A1* | 4/2008 | Ahokangas ........... H04W 48/18 370/328 |
| 2013/0150051 A1* | 6/2013 | Van Phan ............. H04W 12/04 455/437 |

OTHER PUBLICATIONS

3gpp TS 23.303 V13.1.0 (Sep. 2015), 3rd Generation Partnership Project; Technical Specification Group Services and System Aspects; Proximity-based services (ProSe); Stage 2 (Release 13) (available at www.3gpp.org).
"3GPP TR 22.803 V12.2.0 (Jun. 2013)," 3rd Generation Partnership Project; Technical Specification Group Services and Systems Aspects; Feasibility study for Proximity Services (ProsSe) (Release 12) (available at www.3gpp.org).

* cited by examiner

*Primary Examiner* — Frank Duong

(57) ABSTRACT

Techniques described herein may be used to remotely troubleshoot radio access networks (RANs). A server may communicate with a base station of a RAN via a site router of the RAN. At some point, the server may detect a RAN failure event that prevents the server from communicating with a base station. The server may identify a working RAN near the failed RAN and a user device within the coverage area of the working RAN that can establish a device-to-device (D2D) connection with the base station of the failed RAN. As such, the server may establish an alternative connection to the base station of the failed RAN via the base station of the working RAN and the D2D connection. The server may use the alternative connection to determine reason for the RAN failure and to implement procedures for restoring the failed RAN to working order.

20 Claims, 9 Drawing Sheets

RADIO ACCESS NETWORK TROUBLESHOOTING USING DEVICE-TO-DEVICE COMMUNICATIONS

BACKGROUND

Wireless telecommunication networks often include a core network that is connected to multiple radio access networks (RANs). The RANs enable user devices (e.g., a smartphone, a tablet computer, etc.) to connect to the wireless telecommunications network. Each RAN may include one or more devices, such as a base station and a site router. The base station may provide user devices with wireless connectivity to the network and the site router may connect the base station to the core network.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

Figure 1A:
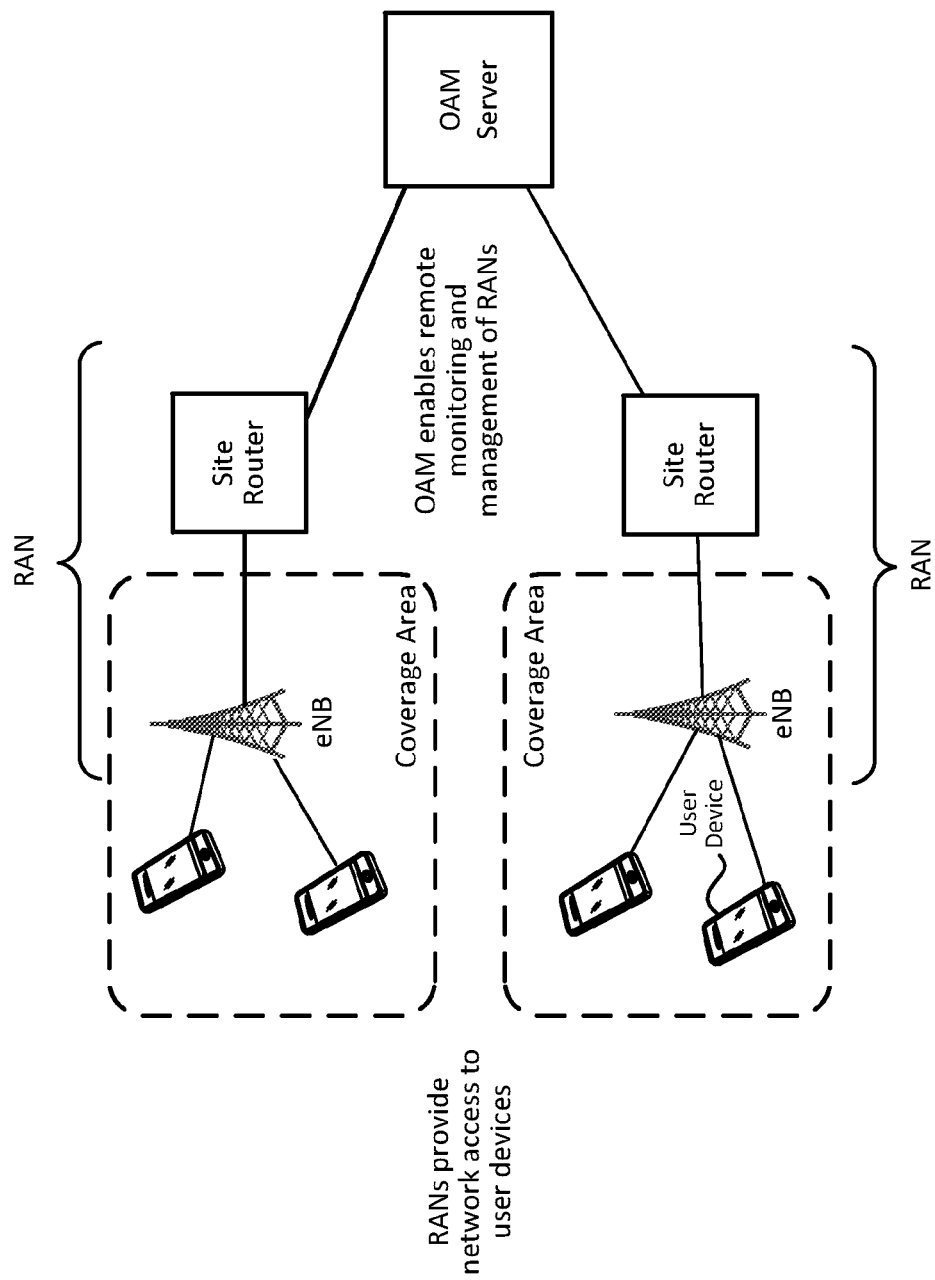
FIGS. 1A and 1B are diagrams illustrating an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

As mentioned above, a radio access network (RAN) may include one or more devices, such as a base station and a site router. The base station may provide wireless connectivity to user devices (e.g., smartphone, tablet computers, etc.) and the site router may connect the base station to the core network. Because of the geographically distributed nature of a wireless telecommunications network, multiple RANs are often managed and supported from a centralized server, such as an operations, administration, and management (OAM or O&AM) server. However, because a RAN may include multiple devices, it may be difficult to provide technical support for a RAN in certain situations. For instance, if an OAM server is unable to communicate with a particular base station, it may be difficult to determine whether the source of the problem is the base station itself, the site router, or both the base station and the site router. (This phenomena may be due to the OAM server having to communicate with the base station via the site router.) As a result, technical support teams must often be dispatched to the physical location of the RAN in order to diagnose the source of the problem before a solution can be developed and executed. As such, an inability to identify the source of a problem within a RAN may give rise to extra time, effort, and economic costs required to manage and maintain a wireless telecommunications network.

Techniques described herein may be used to manage and maintain RANs remotely by using device-to-device (D2D) technologies. For instance, an OAM server may detect a RAN failure within a wireless telecommunications network. The RAN failure may include a site router failing to operate properly. As such, the OAM may be aware that the site router has failed; however, the OAM server to be unsure as to the operational status of the corresponding base station. The OAM server may determine the operational status of the base station by establishing a connection to the base station using D2D connections.

For instance, the OAM server may identify a working RAN within geographic proximity of the failed RAN. Additionally, the OAM server may identify user devices within the coverage area of the working RAN and user devices that were within the coverage area of the failed RAN at the time of the failure. The OAM server may cause a D2D connection to be established from the working RAN to the base station of the failed RAN using the D2D capabilities of user devices between the base station of the working RAN and the base station of the failed RAN. In this manner, the OAM server may establish a connection with the base station of the failed RAN despite the inoperability or unresponsiveness of the site router of the failed RAN. Additionally, the OAM server may use the D2D connection with the base station of the failed RAN to perform diagnostic and troubleshooting operations in an attempt to determine whether the base station of the failed RAN is operating properly and, if not, determine the source of the problem in order to develop a solution for fixing the failed RAN as soon as possible. In this manner, D2D technologies may be used to manage and support RANs in an expeditious and efficient manner.

Figure 1B:
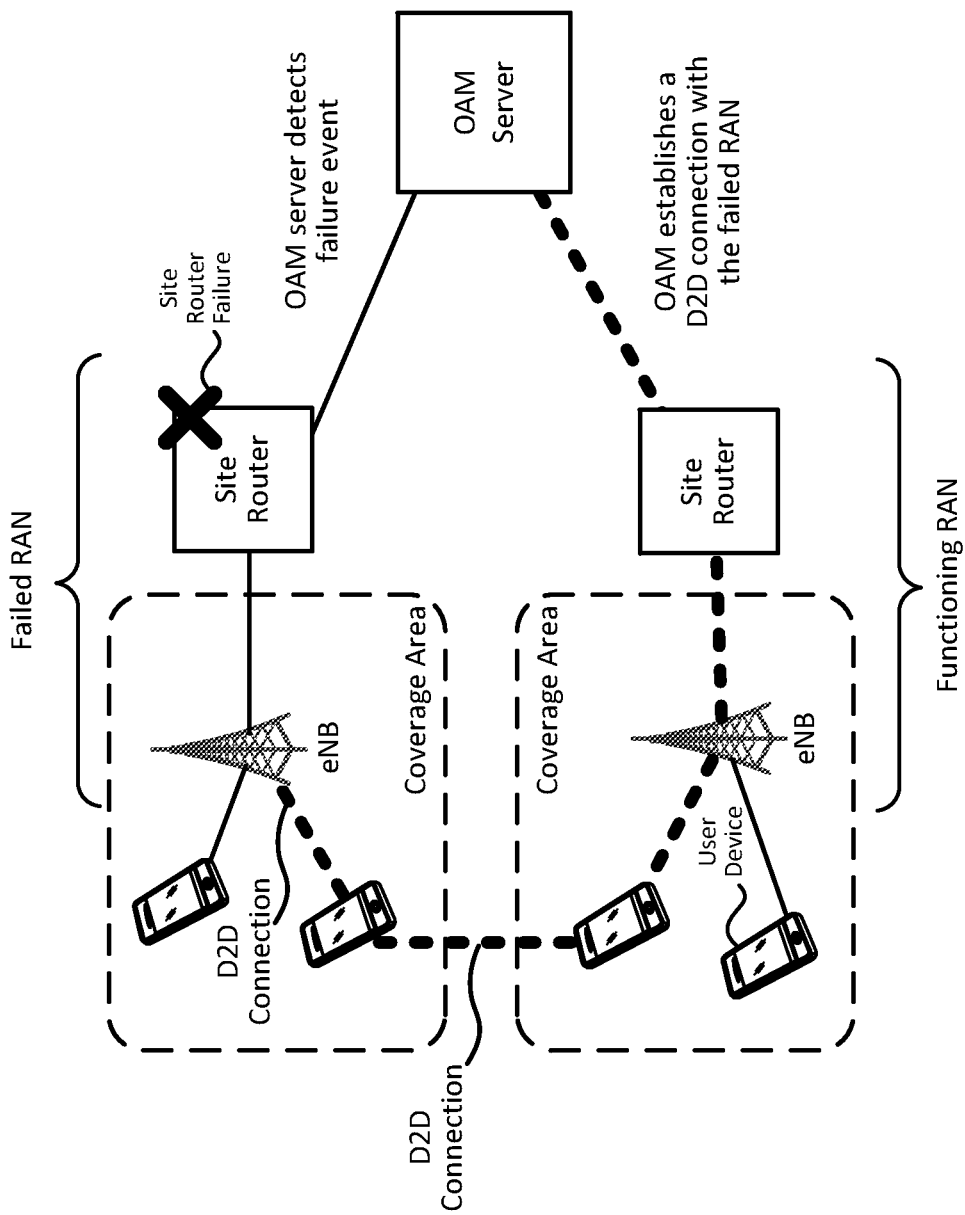

FIGS. 1A-1B illustrates an example overview of an implementation described herein. As shown in FIG. 1A, an OAM server may be in communication with multiple RANs. Each RAN may include a site router and a base station, such as an enhanced Node B (eNB). The RANs may provide network access to user devices within their respective coverage areas, and the OAM server may remotely monitor and manage the RANs to help ensure that the each RAN operates as intended and to identify and remedy problems as they arise. As such, FIG. 1A provides an example of a typical network condition where the RAN are operating properly.

Referring now to FIG. 1B, one of the RANs may experience a failure event (also referred to as a RAN failure) such that the OAM server is no longer able to communicate with the failed RAN. Examples of a failure event may include a software or hardware failure of the eNB, a software or hardware failure of the site router, a cable connecting the OAM to the RAN being severed, a power outage, etc. In the example of FIG. 1B, the failure event includes a failure of the site router.

The OAM server may detect the failure event and identify another RAN that may be used to establish a connection with the failed RAN. For instance, the OAM server may identify a RAN that is located within proximity of the failed RAN. The OAM server may also identify a user device connected to the eNB of the functioning RAN that may be used to establish a D2D connection with the failed RAN. In some implementations, the user device connected to the eNB of the functioning RAN may be sufficiently close to the eNB of the failed RAN so as to establish a D2D connection without additional user devices. In some implementations, the D2D connection may require multiple user devices to establish the D2D connection.

The D2D connection may enable the OAM server to communicate with the eNB of the failed RAN, which may enable the OAM server to identify the reason for the RAN failure. For instance, the OAM server may perform tests, collect performance information, retrieve failure event records, etc., which may enable the OAM server to ascertain the source of the failure. In the example of FIG. 1B, the OAM server may determine that the eNB of the failed RAN appears to be operating properly with the exception of not being able to communicate with the site router. As such, the OAM server may conclude that the failure event was caused by the site router and may promptly dispatch a team of technicians to travel to the location of the site router and either repair or replace the site router.

While the example of FIG. 1B includes a problem that requires technicians to be dispatched, in other scenarios, the OAM server may be able to diagnose and remedy the failure remotely. For instance, depending on the nature of the failure event, the failure may be remedied by the OAM server restarting the eNB or the site router, providing software updates to the eNB or the site router, changing the configuration parameters of the eNB or the site router, etc. As such, techniques described herein provide an elegant and efficient solution to diagnosing and remedying RAN failures.

Figure 2:
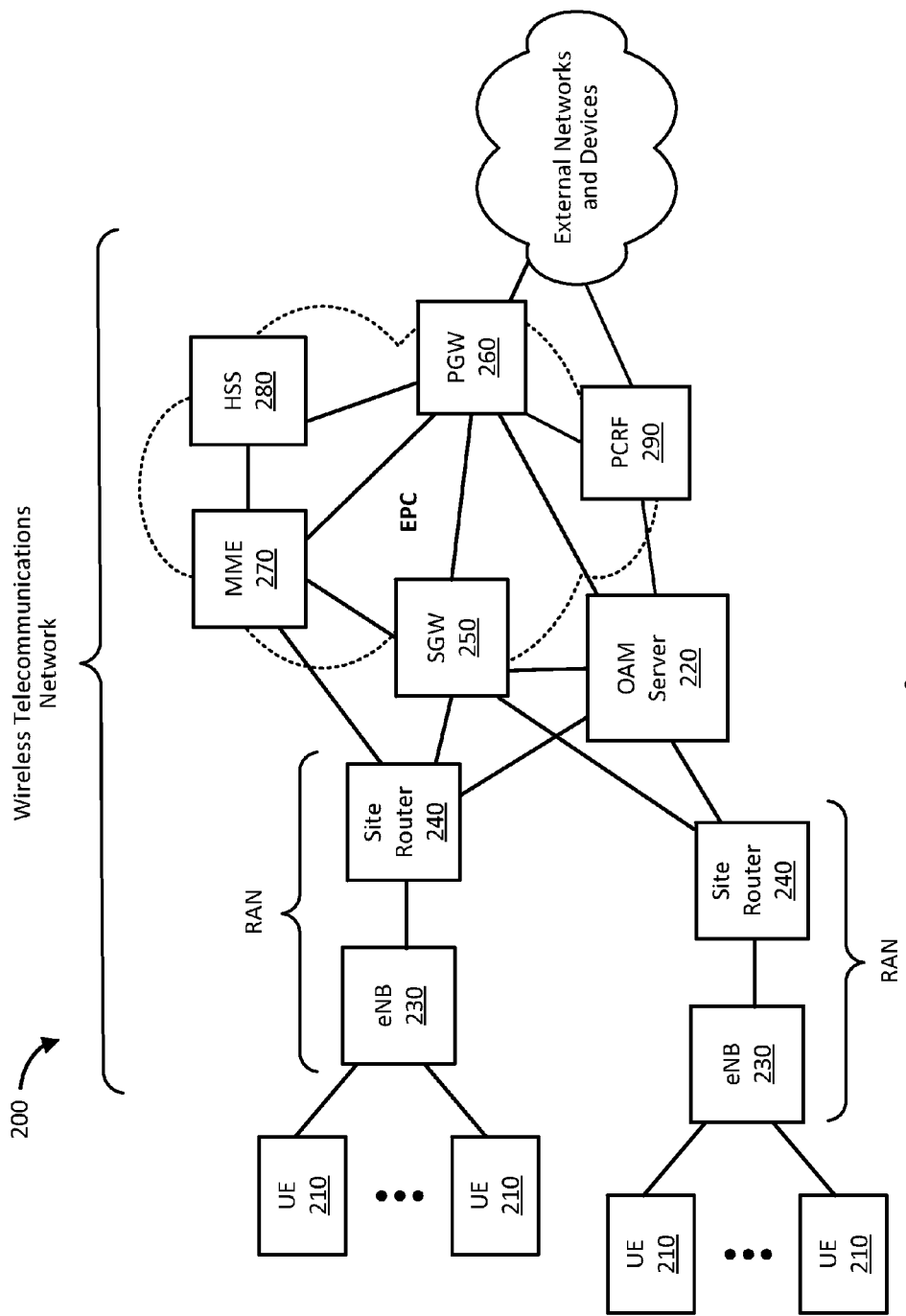
FIG. 2 is a diagram of an example environment in which systems and/or methods described herein may be implemented.

FIG. 2 is a diagram of an example environment 200 in which systems and/or methods described herein may be implemented. Environment 200 may include user devices 210, an OAM server 220, a wireless telecommunications network, and external networks and devices. The wireless telecommunications network may include an Evolved Packet System (EPS) that includes a Longer Term Evolution (LTE) network and/or an evolved packet core (EPC) network that operates based on a 3rd Generation Partnership Project (3GPP) wireless communication standard. The LTE network may be, or may include, RANs that include one or more base stations, some or all of which may take the form of eNBs 230 and/or one or more site routers 240, via which user devices 210 may communicate with the EPC network.

The EPC network may include Serving Gateway (SGW) 250, PDN Gateway (PGW) 260, Mobility Management Entity (MME) 270, Home Subscriber Server (HSS) 280, and/or Policy and Charging Rules Function (PCRF) 290. As shown, the EPC network may enable user devices 210 to communicate with an external network, such as a Public Land Mobile Networks (PLMN), a Public Switched Telephone Network (PSTN), and/or an Internet Protocol (IP) network (e.g., the Internet).

User device 210 may include a portable computing and communication devices, such as a personal digital assistant (PDA), a smart phone, a cellular phone, a laptop computer with connectivity to the wireless telecommunications network, a tablet computer, etc. User device 210 may also include a non-portable computing device, such as a desktop computer, a consumer or business appliance, or another device that has the ability to connect to a RAN of the wireless telecommunications network. User device 210 may be capable of establishing a D2D connection with another device, such as another user device 210 or eNB 230, based on instructions from OAM server 220. For instance, user device 210 may receive instructions from OAM server 220 to establish a D2D connection with a particular eNB 230, and user device 210 may attempt to establish the connection with the eNB 230 directly or via one or more other user devices 210. Once the D2D is established, user device 210 may operate as a relay for information communicated between OAM server 220 and another device (e.g., eNB 230, site router 240, etc.).

OAM server 220 may include one or more computing devices, such as a server device or a collection of server devices, capable of enabling remote monitoring and management of RANs within the wireless telecommunications network. In some implementations, OAM server 220 may detect a failure event corresponding to a RAN. The failure event may prevent OAM server 220 from communicating with one or more network device within the RAN (e.g., eNB 230 or site router 240). As such, OAM server 230 may establish a new connection with one or more of the network device of the RAN using another RAN and user devices within the coverage area of the wireless telecommunications network. OAM server 220 may use the new connection to determine the source and nature of the failure event and take steps to restore the failed RAN to proper working order. As depicted in FIG. 2, OAM server 220 may include a server device that is not part of the EPC of the wireless telecommunications network. Alternatively, in some implementations, OAM server 220 may be located within the EPC and/or may be incorporated into another network device of the EPC.

eNB 230 may include one or more network devices that receives, processes, and/or transmits traffic destined for and/or received from user device 210 (e.g., via an air interface). eNB 230 may be connected to a network device, such as site router 240, that functions as an intermediary for information communicated between eNB 230 and the EPC. In some implementations, eNB 230 may be capable of detecting an event failure with a RAN to which the eNB 230 belongs. In response to the event failure, eNB 230 may enter into a D2D connection mode that enables eNB 230 to establish a wireless D2D connection with user device 210. In some implementations, the D2D connection mode may also enable eNB 230 to establish a D2D connection with another device, such as site router 240. A D2D connection, as used, herein, may refer to D2D Proximity Services (ProSe), as defined in the 3rd Generation Partnership Project (3GPP) technical specifications, such as in "3GPP TR 22.803, Technical Specification Group Services and Systems Aspects; Feasibility study for Proximity Services (ProSe) (Release 12)" (available at www.3gpp.org).

Additionally, eNB 230 may assist OAM server 220 in determining the reason for a failure event and/or executing instructions from OAM server 220 in order to recover from the failure event. For example, eNB 230 may automatically collect information regarding network conditions leading up to (or resulting from) the failure event and may provide the information to OAM server 220. As another example, based on instructions from OAM server 220, eNB 230 may perform a system restart operation, a software update operation, a settings configuration operations, etc., in order to recover from the failure event.

Site router 240 may include a computing and communication device that acts to communicate information between OAM server 220, eNB 230, and/or other devices of the EPC. Site router 240 may implement various network rules, communication protocols, and security policies, which may be based on configuration parameters received from OAM server 220. Site router 240 may be, or include, a router, switch, hub, gateway, etc. As depicted in FIG. 2, in some implementations, site router 240 may be a standalone device. In other implementations, site router 240 may be incorporated into another device, such as eNB 230.

Additionally, site router 240 may assist OAM server 220 in determining the reason for a failure event and/or executing instructions from OAM server 220 in order to recover from the failure event. For example, site router 240 may automatically collect information regarding network conditions leading up to (or resulting from) the failure event and may provide the information to OAM server 220. As another example, based on instructions from OAM server 220, site router 240 may perform a system restart operation, a software update operations, etc., in order to recover from the failure event. In some implementations, if recently installed or updated software was the source of a RAN failure, an administrator may initiate a rollback function to be performed on eNB 230 and/or site router 240 to restore eNB 230 and/or site router 240 to a state that predated the software installation or update. The example depicted in FIG. 2 includes only one router device (i.e., site router 240) between eNB 230 and OAM server 220. In some implementations, the connection between eNB 230 and OAM server 220 may include multiple routers and/or other network devices, which may correspond to a backhaul transport network of the wireless telecommunications network.

SGW 250 may aggregate traffic received from one or more eNBs 220 and may send the aggregated traffic to an external network or device via PGW 260. Additionally, SGW 250 may aggregate traffic received from one or more PGWs 260 and may send the aggregated traffic to one or more eNBs 230. SGW 250 may operate as an anchor for the user plane during inter-eNB handovers and as an anchor for mobility between different telecommunication networks. PGW 260 may include one or more network devices that may aggregate traffic received from one or more SGWs 250, and may send the aggregated traffic to an external network. PGW 260 may also, or alternatively, receive traffic from the external network and may send the traffic toward user device 210 (via SGW 250 and/or eNB 230).

MME 270 may include one or more computation and communication devices that act as a control node for eNB 230 and/or other devices that provide the air interface for the wireless telecommunications network. For example, MME 270 may perform operations to register user device 210 with the wireless telecommunications network, to establish bearer channels (e.g., traffic flows) associated with a session with user device 210, to hand off user device 210 to a different eNB, MME, or another network, and/or to perform other operations. MME 270 may perform policing operations on traffic destined for and/or received from user device 210.

HSS 280 may include one or more devices that may manage, update, and/or store, in a memory associated with HSS 280, profile information associated with a subscriber (e.g., a subscriber associated with user device 210). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with user device 210. Additionally, or alternatively, HSS 280 may perform authentication, authorization, and/or accounting operations associated with the subscriber and/or a communication session with user device 210.

PCRF 290 may receive information regarding policies and/or subscriptions from one or more sources, such as subscriber databases and/or from one or more users. PCRF 290 may provide these policies to PGW 260 or another device so that the policies can be enforced. As depicted, in some implementations, PCRF 290 may communicate with PGW 260 to ensure that charging policies are properly applied to locally routed sessions within the telecommunications network. For instance, after a locally routed session is terminated, PGW 260 may collect charging information regarding the session and provide the charging information to PCRF 290 for enforcement.

Figure 3:
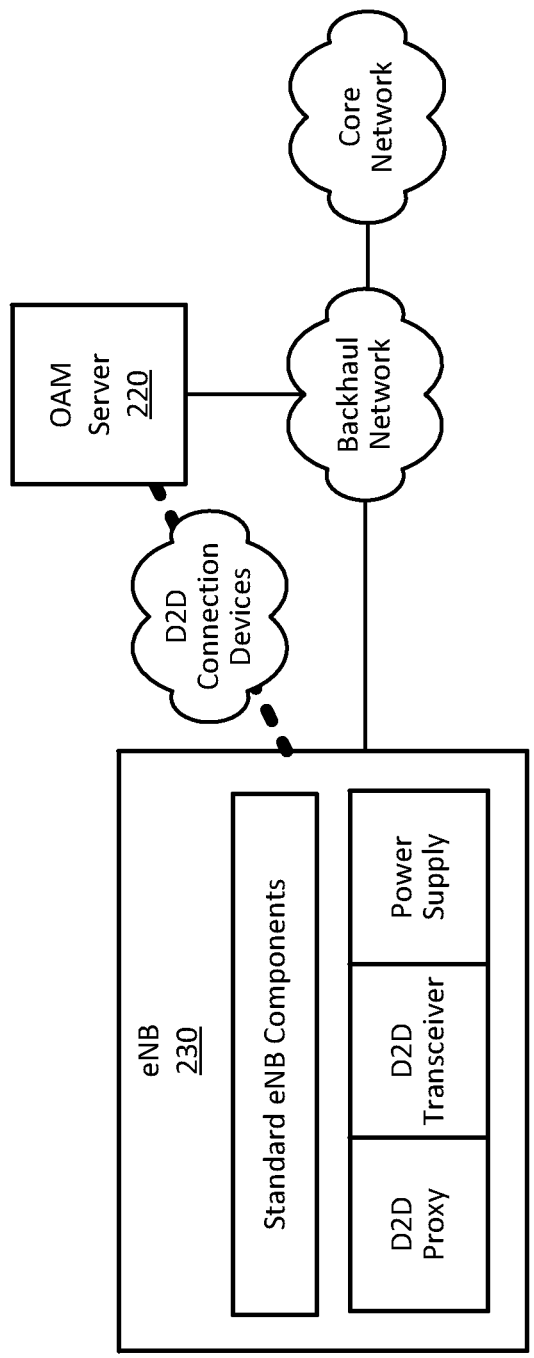
FIG. 3 is a diagram of an example of components of an enhanced Node B (eNB)

FIG. 3 is a diagram of an example of components of eNB 230. As shown, eNB 230 may include standard eNB components, a proxy module ("D2D proxy"), a D2D transceiver, and a power supply. The D2D transceiver may refer to a particular communication mode for LTE user equipment (UE) transcevier. The standard eNB components may include hardware and/or software components that enable eNB 230 to function as a base station under normal operating conditions (e.g., providing wireless connectivity to user device, implementing network management and security policies, relaying information between user devices 210 and the core network, etc.).

The proxy module may include hardware and software for detecting and responding to failure events. For instance, the proxy module may enable eNB 230 to detect a failure event, such as the loss of power, an inability to communicate with site router 240 (represented by the backhaul network) or core network, etc. Additionally, the proxy module may enable eNB 230 to setup a D2D connection in order to communicate with OAM server 220. In some implementations, the proxy module may also assist OAM server 220 in diagnosing and remedying a failure event by, for example, causing eNB 230 to provide information to OAM server 220 regarding a failure event, restarting the eNB 230, executing a test or diagnostic operation, etc.

The D2D transceiver may provide the wireless interface that enables eNB 230 to establish the D2D connection with another device, such as user device 210. The power supply may ensure that eNB 230 may perform the instructions contained in the proxy module even if the failure event is a power outage. As depicted in FIG. 3, the proxy module, the D2D transceiver, and the power supply may be internal components of eNB 230. In other implementations, one or more of the proxy module, the D2D transceiver, and the power supply may be implemented by an external device connected to eNB 230. D2D connection devices may include user devices 210 used to establish a D2D connection with eNB 230 of the failed RAN.

Figure 4:
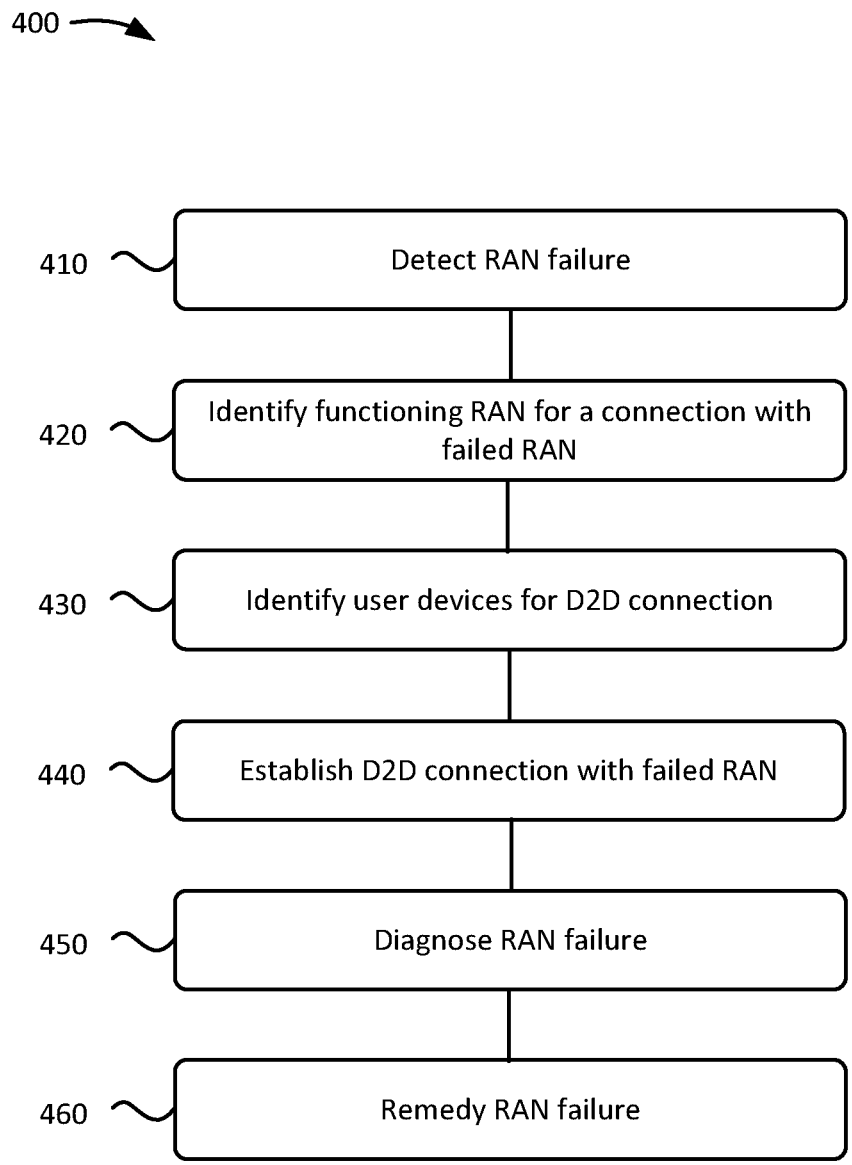
FIG. 4 is a flowchart diagram of an example process for responding to a radio access network (RAN) failure.

FIG. 4 is a flowchart diagram of an example process 400 for responding to a RAN failure. In some implementations, process 400 may be implemented by OAM server 220. In some implementations, process 400 may be implemented by a combination of OAM server 220 and eNB 230.

As shown, process 400 may include detecting a RAN failure (block 410). For example, OAM server 220 may detect a failure event corresponding to a particular RAN of a wireless telecommunications network. As mentioned above, the failure event may include a software or hardware failure of eNB 230, a software or hardware failure of the site router 240, a failure of a cable connection between eNB 230 and site router 240, a failure of a cable connection between OAM server 220 and site router 240, a power outage, etc. In some implementations, OAM server 220 may be capable of detecting the RAN failure in one or more ways, such as a preselected amount of time passing without OAM server 220 receiving information from eNB 230 or site router 240, detecting that eNB 230 and/or site router 240 are not responsive to communications from OAM server 220, receiving a notification from site router 240 that eNB 230 is nonresponsive or malfunctioning, receiving incomplete transmissions from eNB 230 or site router 240, etc.

Process 400 may also include identifying a functioning RAN for establishing a connection with the failed RAN (block 420). For example, OAM server 220 may identify a RAN within the telecommunications network that is near the failed RAN. In some implementations, OAM server 220 may do so by identifying the failed RAN and querying a data structure that associates RANs of the network with geographic distances between the RANs. In some implementations, the data structure may also include other information, such as a broadcast range of each RAN, landscape features that may limit the effective broadcast range of each RAN, and/or how the effective broadcast range compares to the geographic distances between the RANs.

For instance, in some scenarios, a first RAN may be geographically closer to the failed RAN than a second RAN; however, due to conditions limiting the effective range of the RAN (such as mountains, hills, buildings, etc.) the effective ranges of the first RAN and the second RAN may be such that the second RAN is actually more appropriate for establishing a D2D connection with the eNB of the failed RAN. In some implementations, OAM server 220 may also consider the network congestion and other performance characteristics when identifying or selecting a RAN for establishing the D2D connection with the failed RAN.

For example, if a first RAN and a second RAN are the same distance from the failed RAN, OAM server 220 may select the RAN with the least congestion for establishing the D2D connection with the failed RAN. As another example, OAM server 220 may consider the actual locations of user devices 210 with respect to RANs. For instance, if two functioning RANs are similar distances away from the failed RAN, OAM server 220 may select the RAN with user devices 210 nearest to the coverage area of the failed RAN. Additionally, OAM server 220 may determine the last known locations of user devices 210 within the failed RAN (e.g., by querying the core network) and select a functioning RAN based on the proximity between the location of user devices 210 in the functioning RAN relative to the last known locations of user devices 210 in the failed RAN. In doing so, OAM server 220 may be able to select a functioning RAN that will enable the D2D connection to be established using the fewest number of user devices 210.

In some implementations, OAM server 220 may verify that a failed RAN is capable of establishing the D2D connection before taking steps to establish a D2D connection with the failed RAN. For instance, when eNB 230 is launched or restarted, the proxy module of eNB 230 may cause eNB 230 to notify OAM server 220 that eNB 230 is capable of establishing a D2D connections. OAM server 220 may store a record of the notification, and if the RAN of eNB 230 experiences a failure event, OAM server 220 may access the notification to verify that eNB 230 has D2D capabilities prior to establishing a D2D connection with eNB 230.

Process 400 may also include identifying user devices for D2D connections (block 430). For example, OAM server 220 may identify user devices 210 located within the coverage area of the functioning RAN that was identified by OAM server 220 for establishing the connection with the failed RAN. In some implementations, OAM server 220 may identify user devices 210 based on one or more criteria, such as whether user device 210 is capable of establishing a D2D connection and whether user device 210 is capable of operating as a relay within a connection. Additional examples of such criteria may include a broadcast range of user device 210, the broadcast range of user device 210 relative to a geographic proximity of another user device 210 or the eNB 230 of the failed RAN, whether each user device 210 is available to establish the D2D connection and function as a relay in the D2D connection, whether user device 210 has an enough battery life for maintain the D2D connection, etc.

Process 400 may also include establishing a D2D connection with the failed RAN (block 440). For example, OAM server 220 may establish a D2D connection with the eNB 230 of the failed RAN using the RAN and user devices 210 previously identified for the connection. In some implementations, OAM server 220 may establish the D2D portion of the connection by communicating appropriate instructions and configuration parameters to user devices 210 identified to participate in the connection. In some implementations, establishing a D2D connection with the eNB 230 of the failed RAN may require the identification and participation of some user devices 210 that are outside the coverage area of the functioning RAN.

As such, OAM server 220 may identify such user devices 210 by causing user devices 210 within the coverage area of the functioning RAN to broadcast requests for other user devices 210 (e.g., user devices closer to the eNB 210 of the failed RAN) to participate in the D2D connection. In this manner, the D2D connection may grow incrementally (e.g., from one user device 210 to another) until the D2D connection reaches the eNB 230 of the failed RAN. In some implementations, the proxy module of the eNB 230 of the failed RAN may also be proactive in communicating with user devices 210 to establish the D2D connection required to communicate with OAM server 220. In such implementations, the eNB 230 of the failed RAN may use one or more of the techniques described above with reference to identifying user devices for the D2D connection and providing user devices 210 with instructions and configuration parameters for establishing the D2D connection.

Process 400 may also include diagnosing the RAN failure (block 450). For example, OAM server 220 may perform test and diagnostic procedures designed to determine whether the eNB 230 of the failed RAN is operating properly and, if not, to identify the reasons for which the eNB 230 is not operating properly. Examples of such test may include determining whether eNB 230 has an adequate power source (other than the on-board power source described above with reference to FIG. 3) and whether eNB 230 is able to communicate with user devices 210 within the coverage area of eNB 230. Additional examples may include determining whether eNB 230 is able to communicate with other network devices (e.g., site router 240), whether the hardware components of eNB 230 are accounted for and operating properly, whether the software installed on eNB 230 is up-to-date and functioning properly, etc. In some implementations, OAM server 220 may also communicate with site router 240 (via eNB 230) to cause similar tests and diagnostic procedures to be performed on site router 240. In some implementations, eNB 230 may provide OAM sever 220 with a crash report, which may include information representing the state of the failed RAN leading up to the failure and/or immediately after the failure. eNB 230 may use the crash report, along with tests and diagnostic procedures, to identify the cause of the failure.

Process 400 may also include remedying the RAN failure (block 460). For example, OAM server 220 may perform one or more operations to restore the functionality of the failed RAN. The operations performed by OAM server 220 may depend on the nature of the RAN failure as diagnosed by OAM server 220. For instance, OAM server 220 may cause eNB 230 (and/or site router 240) to perform a system restart, restart software installed on eNB 230, uninstall and reinstall certain software, download and install a new software program designed to correct the source of the problem or replace an existing software program that is no longer functioning properly, etc. Additionally, if the nature of the problem requires a technician to replace hardware or provide another type of manual maintenance, OAM server 220 may identify the individual or organization that can provide the service and either provide the appropriate contact information to a system administrator of OAM server 220 or generate and send a request for the service to be provided, along with a description of the problem, to the individual or organization.

Figure 5:
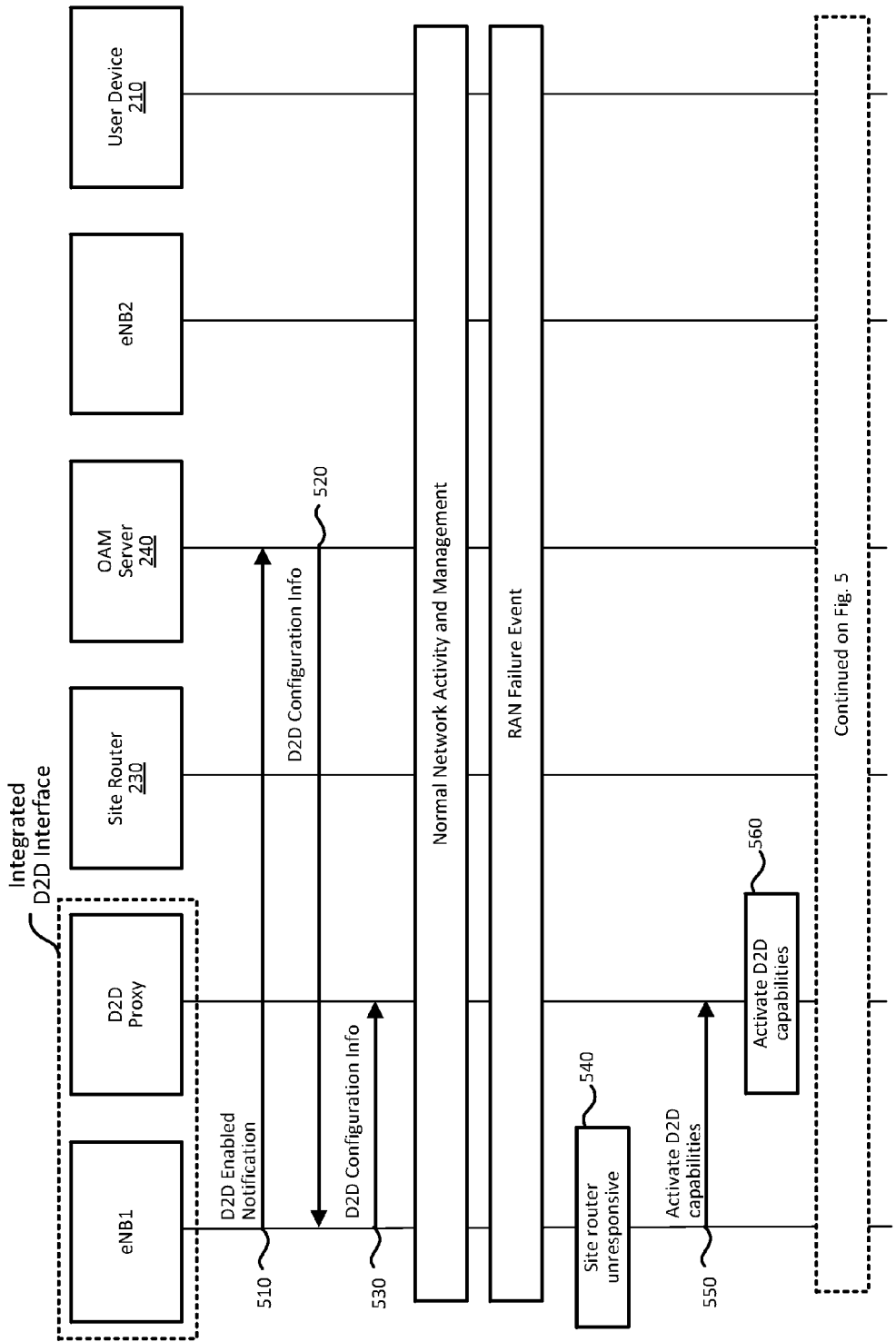
FIGS. 5 and 6 are sequence flow diagrams of an example for responding to a RAN failure.
Figure 6:
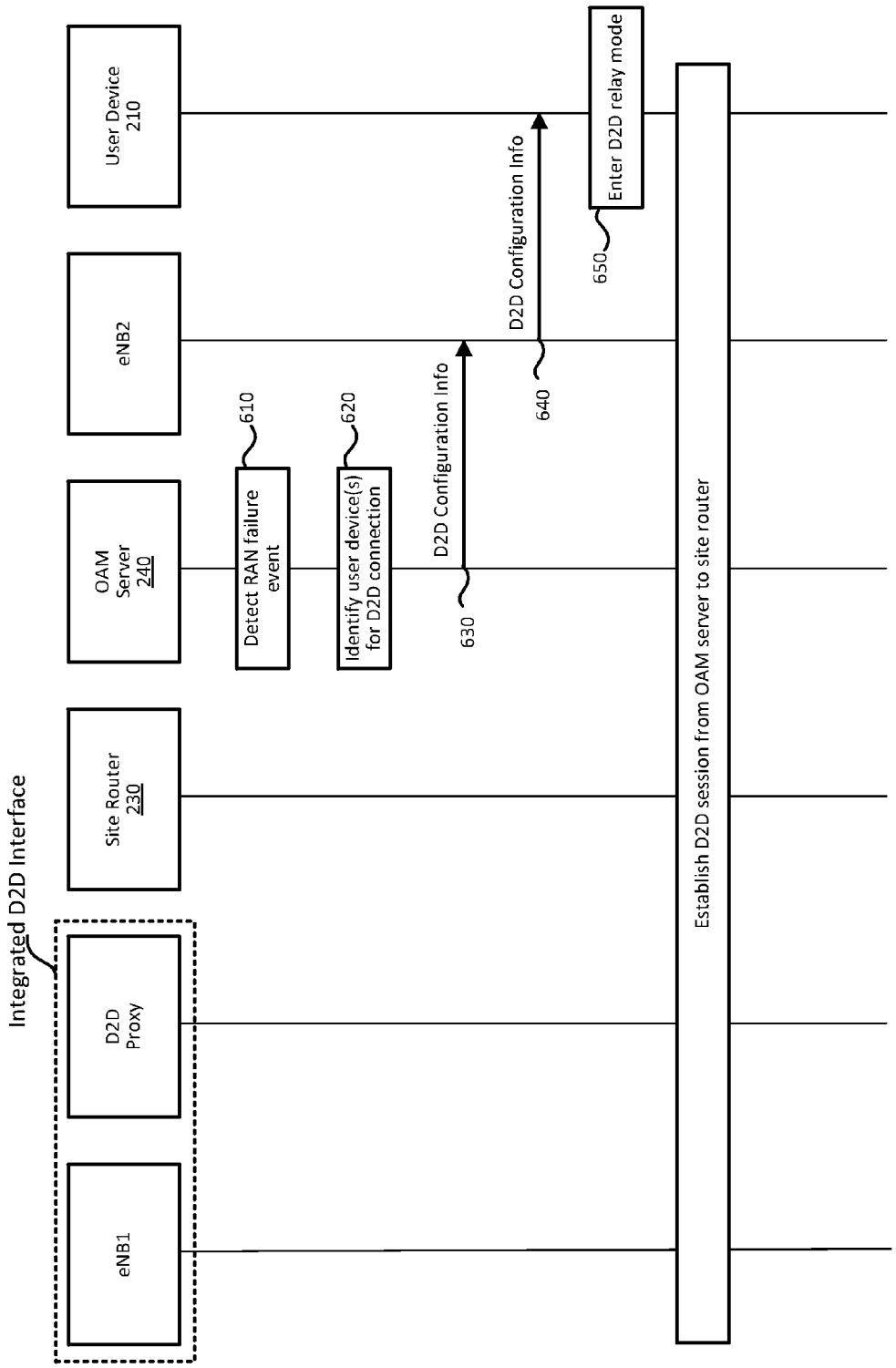

FIGS. 5 and 6 are sequence flow diagrams of an example for responding to a RAN failure. As shown, FIGS. 5 and 6 include eNB1, a D2D proxy, site router 240, OAM server 240, eNB2, and user device 210. eNB1 and eNB2 may each be an example of eNB 230 discussed above. Additionally, eNB1 and site router 240 may correspond to one RAN, and eNB2 may correspond to another RAN.

As depicted in FIG. 5, eNB1 may communicate a D2D enabled notification to OAM server 240 (line 510). The D2D enabled notification may inform OAM server 240 that eNB1 includes an integrated D2D interface capable of establishing a D2D connection with another device. eNB1 may send the D2D enabled notification when eNB1 is initially deployed, restarted, in response to a request from OAM server 240, or according to a schedule that requires the notification to be sent periodically. OAM server 240 may provide eNB1 with D2D configuration information (line 520) that eNB1 may provide to the D2D proxy (line 530). The D2D configuration information may include instructions, network parameters, security policies, and other information that D2D proxy may use to detect failure events and to assist OAM server 240 with diagnosing and resolving the failure events. The D2D configuration information may be sent from OAM server 240 in response to the D2D enabled notification or as part of a procedure to update D2D configuration information throughout the wireless telecommunications network.

The wireless telecommunications network may proceed to function normally in terms of network activity and management. At some point, a RAN failure event may occur with respect to the RAN of eNB1 and site router 240. In the example provided in FIGS. 5 and 6, assume that the failure event include the set router 230 malfunctioning. In this example, eNB1 may detect the RAN failure event by, for example, determining that site router 240 is unreachable or unresponsive (block 540). eNB1 may proceed by communicate a command for the D2D proxy to activity the D2D capabilities of eNB1 (line 550), and D2D proxy may respond accordingly (block 560).

Referring now to FIG. 6, OAM server 240 may also detect the RAN failure event (block 610). For instance, OAM server 240 may detect that eNB1 has become unreachable or unresponsive (though OAM server 240 may not yet know that eNB1 is unresponsive because site router 240 malfunctioning). OAM server 240 may identify devices for establishing a D2D connection with eNB1 (block 620). As discussed above, this may include identifying a RAN and user devices 210 suitable for establishing the D2D connection. OAM server 240 may communicate D2D configuration information, intended for user device 210, to eNB2 (line 630). OAM server 240 may also provide identification information of user device 210 so that eNB2 may forward the D2D configuration information to user device 210 (line 640). The D2D configuration information may cause user device 210 to enter into a D2D relay mode, which may enable OAM server 240 to establish a D2D session from OAM server 240 to site router 240. In some implementations, multiple user devices 210 may be used to create a multi-hop relay. As discussed above, the D2D session (or connection) may enable OAM server 240 to perform various operations for determining the cause of the RAN failure event and restoring the failed RAN to normal operating conditions. By using D2D relay connections that are implemented by user devices, the "normal" radio communication range of an eNB can be extended.

Figure 7:
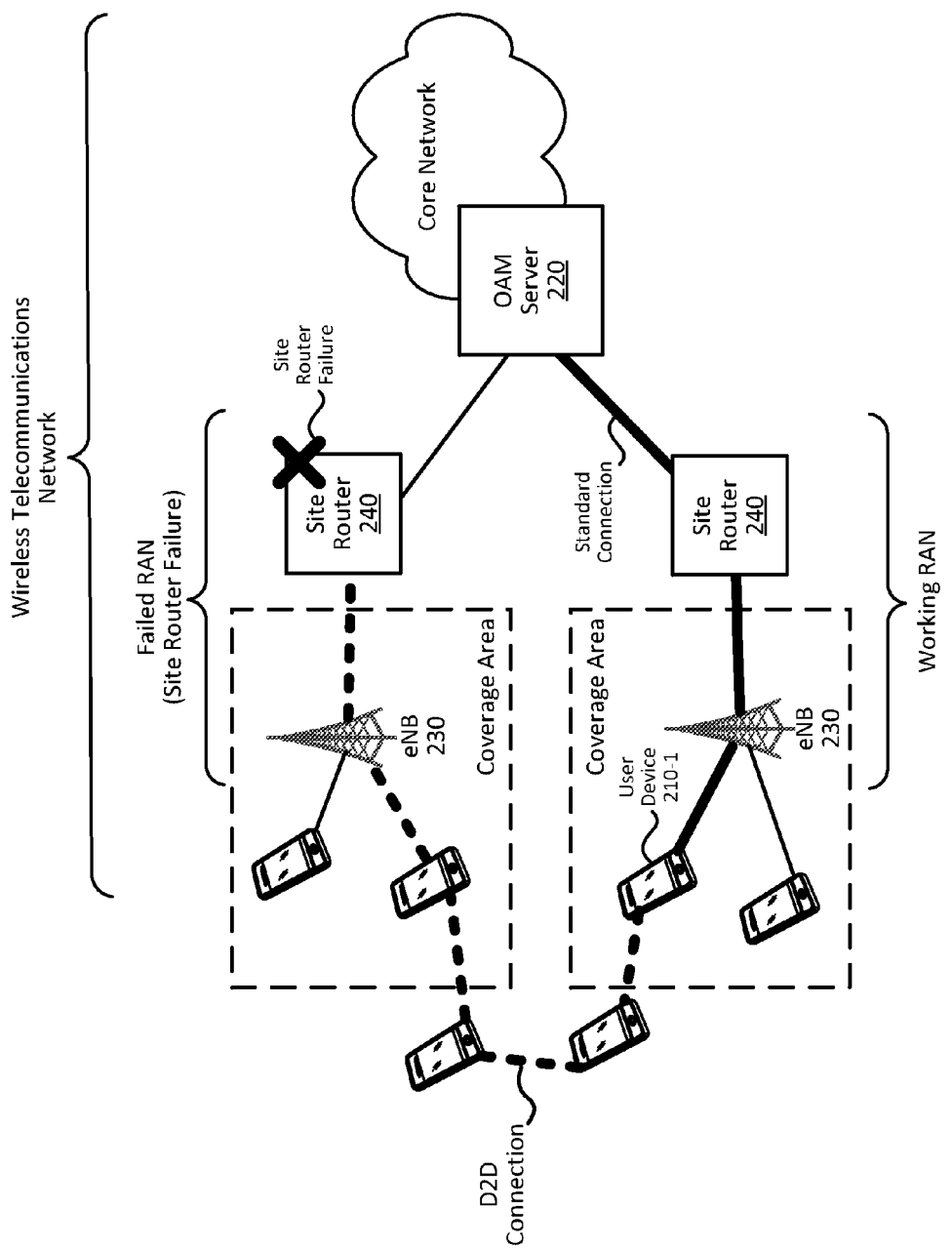
FIG. 7 is a diagram of an example implementation for establishing a connection between an operations, administration, and management (OAM) server and a failed RAN.

FIG. 7 is a diagram of an example implementation for establishing a connecting between OAM server 240 with a failed RAN. As shown, a connection between OAM server 220 and failed site router 240 may include several device, such as a site router 240 and eNB 230 of a working RAN, several user devices 210, and the eNB 230 of the failed RAN. In some implementations, the connection between OAM server 220 and user device 210-1 may be implemented according to a communication standard and protocol that is used during normal networking conditions, and the D2D connections may extend from the first user device 210-1 to the site router 240 of the failed RAN. As such, the connection between OAM server 220 and site router 240 of a failed RAN may involve multipole types of connection. Additionally, since user devices 210 connected to one another via a D2D connection, user devices 210 involved in the connection between OAM server 220 and site router 240 of the failed RAN may be in various locations. For instance, some user devices 210 may be located in a coverage area of the working RAN, some may be located in a coverage area of the failed RAN, and some may be located outside the coverage areas of either RAN.

Figure 8:
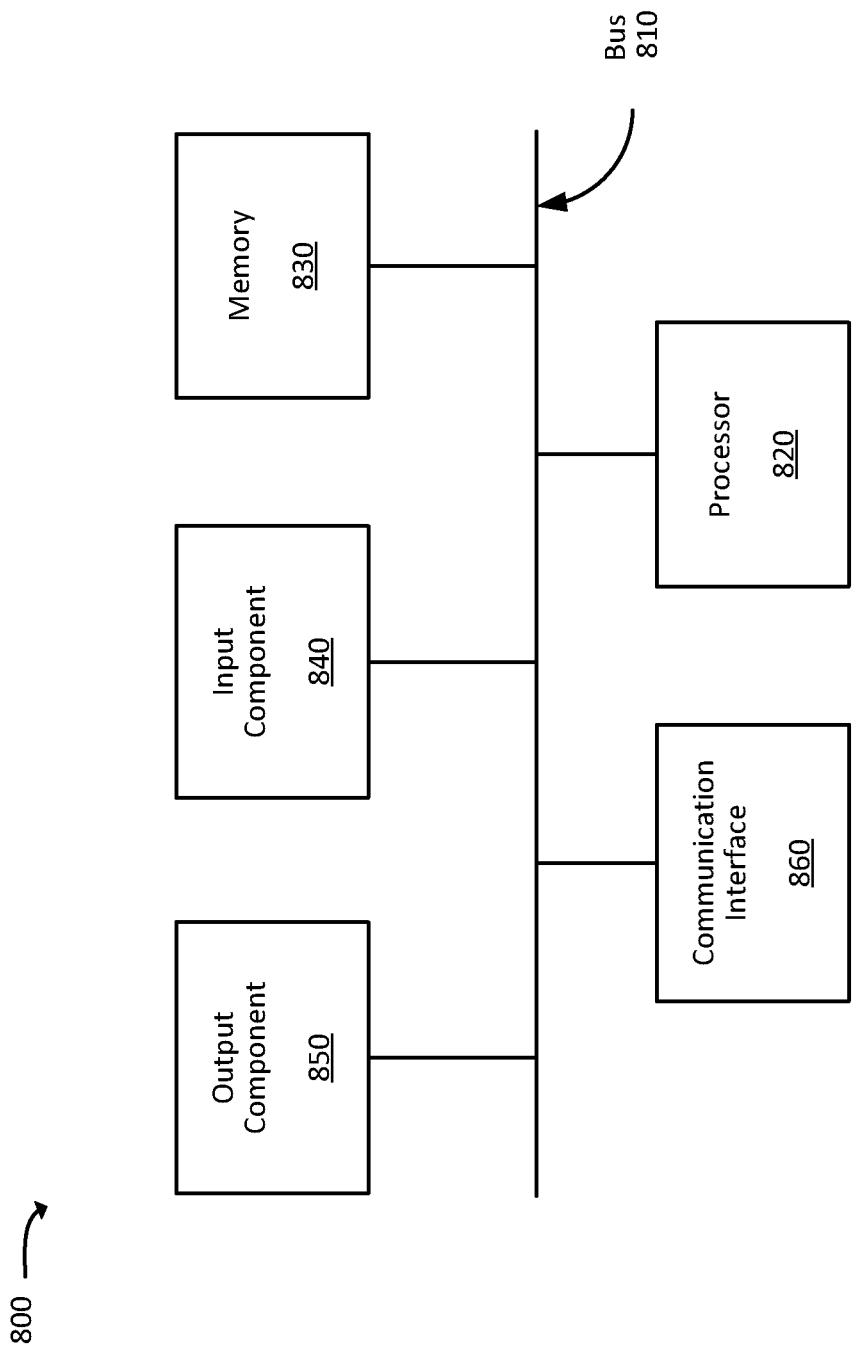
FIG. 8 is a diagram of example components of a device.

FIG. 8 is a diagram of example components of a device 800. Each of the devices illustrated in FIGS. 1A-3 and 4-7 may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of lines, arrows, and/or blocks have been described with regard to FIGS. 4-6 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method performed by a server device, comprising:
communicating, by the server device, with a first base station of a first radio access network (RAN) via a site router of the first RAN;
detecting, by the server device, an inability to communicate with the first base station via the site router;
identifying, by the server device, a second base station of a second (RAN) for establishing an alternative connection to the first base station;
identifying, by the server device, a user device, capable of communicating with the first base station; and
establishing, by the server device, the alternative connection to the first base station via the second base station and the user device.

2. The method of claim 1, further comprising:
determining, by communicating with the first base station via the alternative connection, a cause of the inability to communicate with the first base station via the site router; and
determining a solution to the inability to communicate with the first base station via the site router.

3. The method of claim 1, wherein the alternative connection includes a device-to-device (D2D) connection between the user device and a D2D transceiver of the first base station.

4. The method of claim 3, wherein the establishing of the alternative connection includes:
providing configuration information, to the user device, for establishing the D2D connection with the first base station and for operating as a data relay in the alternative connection; and
providing, to the user device, instructions to establish the D2D connection and to operate as the data relay in accordance with the configuration information.

5. The method of claim 4, wherein the communicating with the first base station includes:

providing, in response to the notification, instructions for responding to the inability to communicate with the server device via the site router, the instructions including to:
activate a proxy server installed on the first base station, establish the D2D connection with a user device, and communicate with the server device via the D2D connection.

6. The method of claim 1, further comprising:
providing the first base station with instruction to perform a diagnostic test regarding an operational status of the first base station;
receiving, from the first base station, a result from the diagnostic test; and
determining, based on the result, whether the first base station was a cause of the inability of the server device to communicate with the first base station.

7. The method of claim 1, further comprising:
communicating with the site router via the alternative connection with the first base station; and
causing the site router to perform a diagnostic test regarding an operational status of the site router; and
receiving, from the site router, a result from the diagnostic test; and
determining, based on the result, whether the site router was a cause of the inability of the server device to communicate with the first base station.

8. The method of claim 1, wherein the server device includes an operations, administration, and management (OAM) server of a wireless telecommunications network corresponding to the first RAN and the second RAN.

9. The method of claim 3, wherein the D2D connection between the user device and the first base station includes multiple D2D connections linking a series of user devices between the user device and the first base station.

10. A server device, comprising:
a non-transitory memory device storing a plurality of processor-executable instructions; and
a processor configured to execute the processor-executable instructions, wherein executing the processor-executable instructions causes the processor to:
communicate with a first base station of a first radio access network (RAN) via a site router of the first RAN;
detect an inability to communicate with the first base station via the site router;
identify a second base station of a second (RAN) for establishing an alternative connection to the first base station;
identify a user device within the coverage area of the second base station; and
establish the alternative connection to the first base station via the second base station and the user device.

11. The server device of claim 10, wherein executing the processor-executable instructions causes the processor to:
determine, by communicating with the first base station via the alternative connection, a cause of the inability to communicate with the first base station via the site router; and
determine a solution to the inability to communicate with the first base station via the site router.

12. The server device of claim 10, wherein the alternative connection includes a device-to-device (D2D) connection between the user device and a D2D transceiver of the first base station.

13. The server device of claim 12, wherein, to establish the alternative connection, the processor-executable instructions causes the processor to:
provide configuration information, to the user device, for establishing the D2D connection with the first base station and for operating as a data relay in the alternative connection; and
provide, to the user device, instructions to establish the D2D connection and to operate as the data relay in accordance with the configuration information.

14. The server device of claim 12, wherein, to communicate with the first base station, the processor-executable instructions causes the processor to:
receive a notification, from the first base station, that the first base station is capable of establishing a D2D connection with user devices; and
provide, in response to the notification, configuration information that enables the first base station to communicate with the server device via the D2D connection.

15. The server device of claim 14, wherein, to communicate with the first base station, the processor-executable instructions causes the processor to:
provide, in response to the notification, instructions for responding to the inability to communicate with the server device via the site router, the instructions including:
instructions to activate a proxy server installed on the first base station,
instructions to establish the D2D connection with the user device, and
instructions to communicate with the server device via the D2D connection.

16. The server device of claim 10, wherein executing the processor-executable instructions causes the processor to:
provide the first base station with instruction to perform a diagnostic test regarding an operational status of the first base station;
receive, from the first base station, a result from the diagnostic test; and
determine, based on the result, whether the first base station was a cause of the inability of the server device to communicate with the first base station.

17. The server device of claim 10, wherein executing the processor-executable instructions causes the processor to:
communicate with the site router via the alternative connection with the first base station; and
cause the site router to perform a diagnostic test regarding an operational status of the site router; and
receive, from the site router, a result from the diagnostic test; and
determine, based on the result, whether the site router was a cause of the inability of the server device to communicate with the first base station.

18. A server device, comprising:
a non-transitory memory device storing a plurality of processor-executable instructions; and
a processor configured to execute the processor-executable instructions, wherein executing the processor-executable instructions causes the processor to:
receive a notification, from a first base station of a first radio access network (RAN), via a site router of the first RAN, that the first base station is capable of establishing a device-to-device (D2D) connection with user devices;

provide, to the first base station, via the site router, configuration information to enable the first base station to communicate with the server device via the D2D connection;

detect an inability to communicate with the first base station via the site router;

identify a second base station of a second (RAN) for establishing an alternative connection with the first base station;

identify a plurality of user devices via which a multiple-hop D2D connection between the first and second base station can be established;

cause the user device to establish the D2D connection; and establish the alternative connection with the first base station via the second base station and the D2D connection between the user device and the first base station.

19. The server device of claim 18, wherein, to cause the plurality of user devices to establish the D2D connection, the processor-executable instructions causes the processor to:

provide configuration information, to the plurality of user devices, for establishing the D2D connection with the first base station and for operating as data relays in the alternative connection; and provide, to the plurality of user devices, instructions to establish the D2D connection and to operate as the data relays in accordance with the configuration information.

20. The server device of claim 18, wherein executing the processor-executable instructions causes the processor to:

provide the first base station with instructions to perform a diagnostic test regarding the operational status of the first base station;

receive, from the first base station, a result from the diagnostic test; and determine, based on the result, whether the first base station was a cause of the inability of the server device to communicate with the first base station.

* * * * *